United States Patent [19]

Nishiyama et al.

[11] Patent Number: 5,031,136

[45] Date of Patent: Jul. 9, 1991

[54] SIGNED-DIGIT ARITHMETIC PROCESSING UNITS WITH BINARY OPERANDS

[75] Inventors: Tamotsu Nishiyama; Shigeo Kuninobu, both of Osaka, Japan

[73] Assignee: Matsushita Electric Industrial Co., Ltd., Osaka, Japan

[21] Appl. No.: 239,243

[22] Filed: May 7, 1990

Related U.S. Application Data

[63] Continuation of Ser. No. 136,365, Dec. 22, 1987, Pat. No. 4,935,892, which is a continuation-in-part of Ser. No. 66,817, Jun. 25, 1987, Pat. No. 4,873,660, and a continuation-in-part of Ser. No. 70,565, Jul. 7, 1987, Pat. No. 4,878,192, and a continuation-in-part of Ser. No. 74,892, Jul. 17, 1987, Pat. No. 4,866,655, and a continuation-in-part of Ser. No. 74,971, Jul. 17, 1987, Pat. No. 4,864,528, and a continuation-in-part of Ser. No. 86,967, Aug. 18, 1987, Pat. No. 4,866,657, and a continuation-in-part of Ser. No. 95,525, Sep. 10, 1987, Pat. No. 4,868,777.

[30] Foreign Application Priority Data

Dec. 24, 1986 [JP] Japan .................... 61-313909

[51] Int. Cl.$^5$ ............................ G06F 7/50; G06F 7/52
[52] U.S. Cl. .................................. 364/746.2
[58] Field of Search ....................... 364/746.2

[56] References Cited

U.S. PATENT DOCUMENTS

| | | | |
|---|---|---|---|
| 4,628,472 | 12/1986 | Fensch | 364/746.2 |
| 4,701,877 | 10/1987 | Sahoda et al. | 364/784 |
| 4,864,528 | 9/1989 | Nishiyama et al. | 364/746.2 |
| 4,866,657 | 9/1984 | Nishiyama et al. | 364/746.2 |
| 4,873,660 | 10/1989 | Nishiyama et al. | 364/746.2 |
| 4,878,192 | 10/1989 | Nishiyama et al. | 364/746.2 |
| 4,890,127 | 12/1989 | Darley | 364/746.2 |

OTHER PUBLICATIONS

A VLSI-Oriented High-Speed Divider Using Redundant Binary Representation, Takagi et al., IECE Japan, vol. 167 D #4, pp. 450–457, 4/84.
A VLSI-Oriented High-Speed Multiplier Using Redundant Binary Adder Tree, Takagi et al., IECE Japan, vol. J66.d, pp. 683–690, 6/84.
A New Class of Digital Division Methods; James Robertson, IRE Transactions on Electronic Computers, pp. 218–222, 9/58.
Signed-Digit Number Representation for Fast Parallel Arithmetic, Avizienis, IRE Transactions on Electronic Computers, pp. 389–400, 9/61.
A Class of Binary Divisions Yielding Minimally Represented Quotients Metze IRE Transactions on Electronic Computers, pp. 761–764, 12/62.
Design of the Arithmetic Units of ILLIAC III, Redundancy & Higher Radix Methods, Atkins, IEEE Transacts. on Computers, vol. C-19, pp. 720–732, 8/70.
Multiple Operand Addition and Multiplication, Shanker Singh et al., IEEE Transactions on Computers, vol. C-22, No. 2, pp. 113–120, 2/73.
Concise Papers, Lyon, IEEE Transactions on Communications, pp. 418–425, 4/76.
Real-Time Processing Gains Ground with Fast Digital Multiplier, Waser et al., Electronics, pp. 93–99, 9/77.
High Speed Multiplier Using a Redundant Binary Adder Tree, Harata et al., IEEE International Conference on Computer Design, pp. 165–170, 1984.
High Speed VLSI Multiplication Algorithm With a Redundant Binary Addition Tree, Takagi et al., IEEE Transactions on Computers, vol. C-34, No. 9, pp. 1789–1795, 9/85.
Design of High Speed MOS Multiplier and Divider Using Redundant Binary Representation, Kuninobu et al., Proceedings 8th Symposium on Computer Arithmetic, pp. 80–86, 5/87.

*Primary Examiner*—David H. Malzahn
*Attorney, Agent, or Firm*—Amster, Rothstein & Ebenstein

[57] ABSTRACT

A high speed arithmetic processor includes an array of arithmetic cells which operate on digits internally represented in a signed-digit binary format. Certain of these cells perform subtraction operations on two ordinary binary digits, and produce the difference in a 2-bit signed-digit binary format, without requiring a separate ordinary binary to signed-digit binary converter.

2 Claims, 6 Drawing Sheets

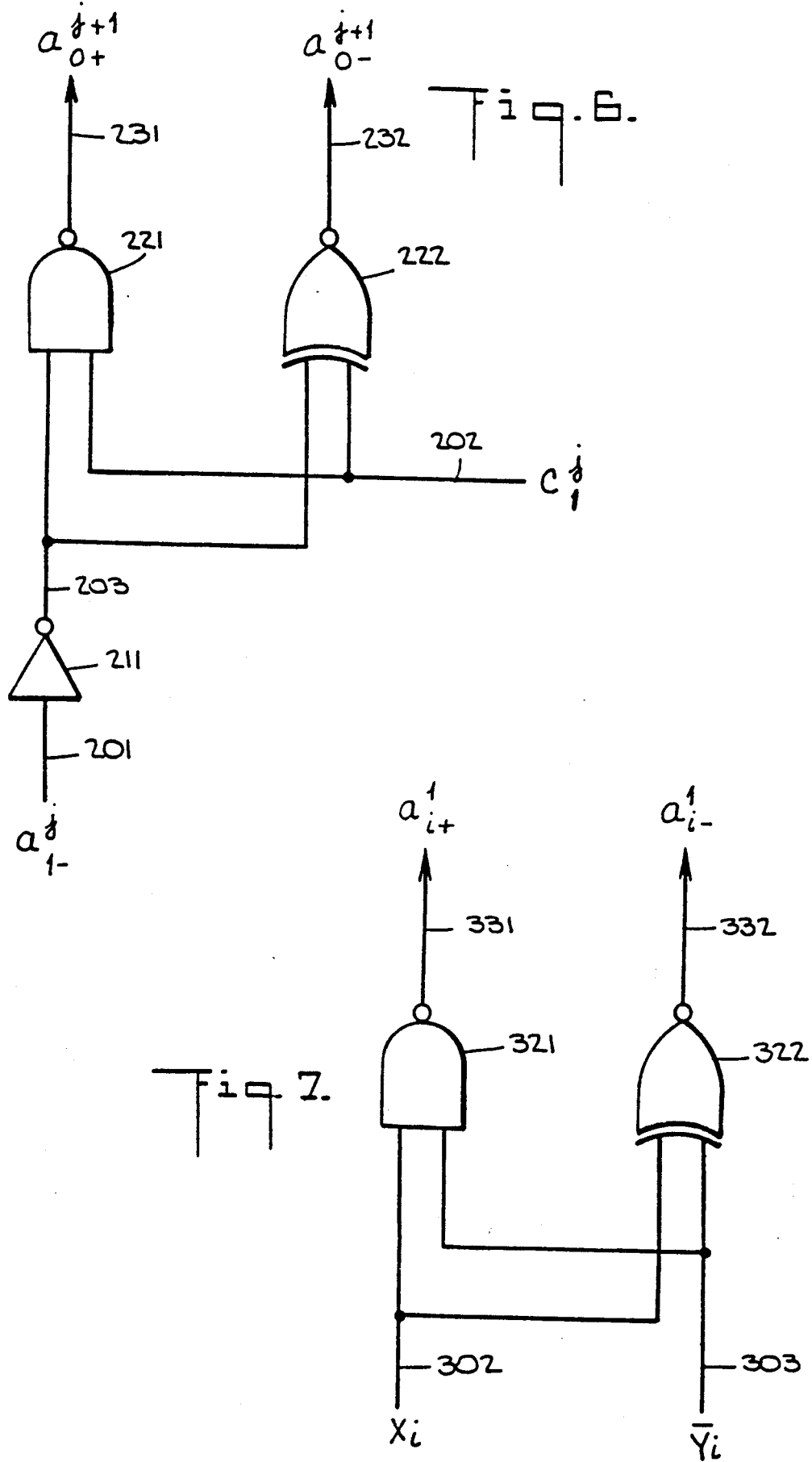

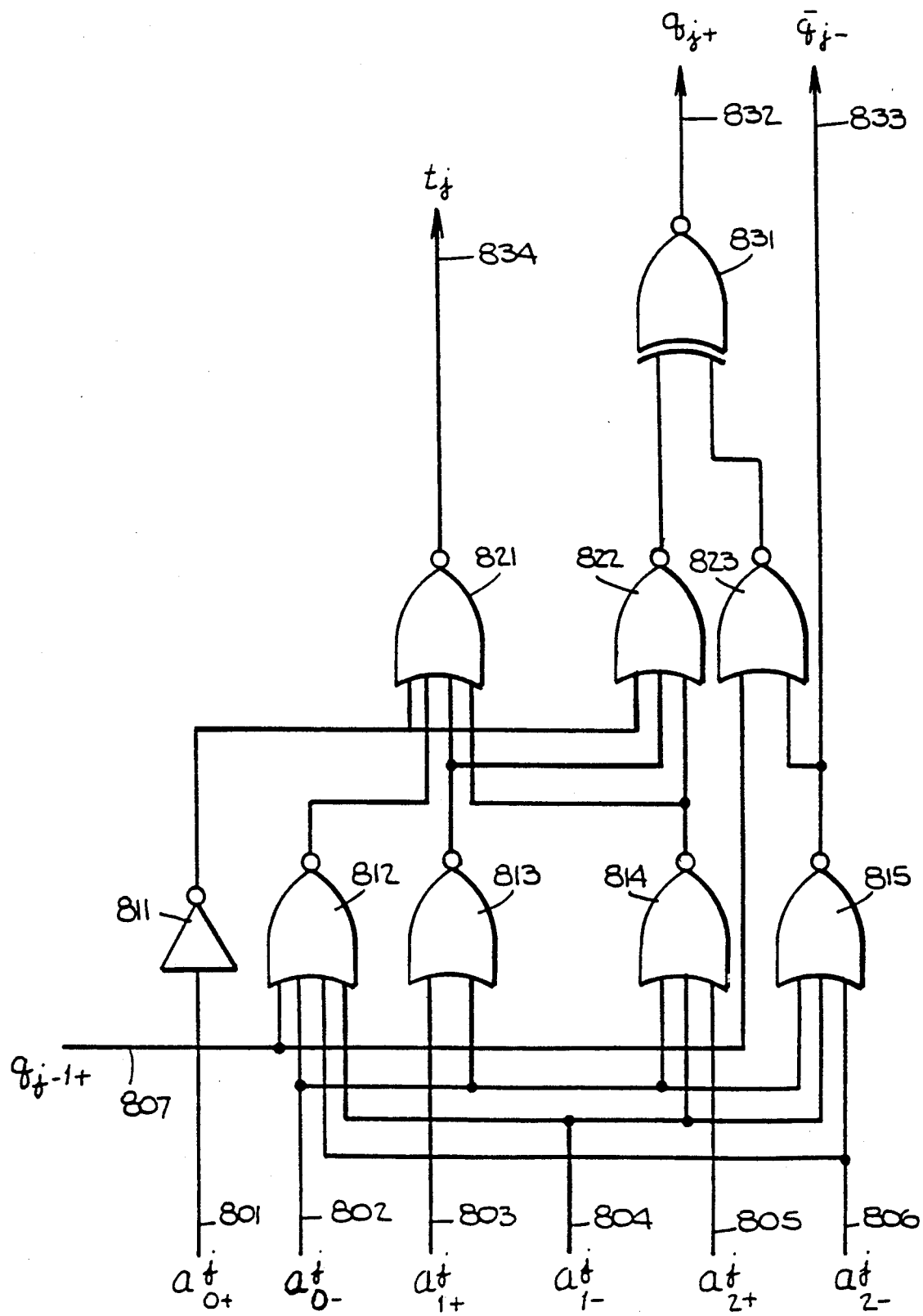

SIGNED-DIGIT ARITHMETIC PROCESSING UNITS WITH BINARY OPERANDS

This is a continuation of application Ser. No. 136,365, filed Dec. 22, 1987, now U.S. Pat. No. 4,935,842, which is a continuation-in-part of application Ser. No. 066,817, filed June 25, 1987, now U.S. Pat. No. 4,873,660; application Ser. No. 070,565, filed July 7, 1987, now U.S. Pat. No. 4,878,192; application Ser. No. 074,892, filed July 17, 1987, now U.S. Pat. No. 4,866,655; application Ser. No. 074,971, filed July 17, 1987, now U.S. Pat. No. 4,864,528; application Ser. No. 086,967, filed Aug. 18, 1987, now U.S. Pat. No. 4,866,657; and application Ser. No. 095,525, filed Sept. 10, 1987, now U.S. Pat. No. 4,868,777. The disclosures of each of the above applications and patents are incorporated herein by reference.

BACKGROUND OF THE INVENTION

This invention relates to a high speed arithmetic processing circuit, particularly to a high speed arithmetic processor with internal adders or subtracters which is capable of high speed arithmetic processing and which can be implemented using LSI technology.

An example of a conventional high speed divider is found in Takagi et al., "A VLSI Oriented High Speed Divider Using Redundant Binary Representation," Trans. Inst. of Electronics and Comm. Engi. Japan, Vol. J67-D, No. 4, pp. 450–457, where a divider is based on a shift subtract divide method wherein each digit is represented by a digit set $[-1, 0, 1]$ which is the redundant binary representation and which is realized by using combinational circuitry which includes four input NOR/OR gates implemented by Emitter-Coupled-Logic (ECL).

This prior art divider is superior to other types of conventional dividers in terms of operating speed and regularity of element layout. However, little consideration was given to reducing the number of transistor elements and the reducing the area on a semiconductor chip required to realize the divider, and to the possibility of using different types of circuit elements, such as CMOS.

Conventional dividers realized by sequential circuitry which consists of a subtracter (or adder) and a shifter are also well known. However, it is also well known that this type of divider inevitably requires relatively long computation time as the number of digits increases. While a high capacity computer with a high speed multiplier which employs a multiplicative division method is known, such prior art devices also require large amounts of hardware to realize the combinational circuitry, making this approach impractical.

SUMMARY OF INVENTION

In accordance with this invention, a new high speed arithmetic processor includes a plural stage partial arithmetic adder or subtracter unit which utilize relatively simple circuit construction, making the processor particularly suitable for VLSI implementation. Specifically, the processor of this invention uses a shift subtract/add divide system which includes a quotient determination circuit which determines the quotient from the partial remainder of the division, or a coefficient determination circuit which determines the coefficient for the partial arithmetic operation which is the multiplier recoder circuit in multiplication. In a plural stage partial arithmetic unit, the product of the coefficient and the divisor or the multiplicand is added or subtracted from the partial remainder or the partial product, and the output of the stage preceding the coefficient determination stage and the signal which represents the least significant digit of the divisor or the multiplicand are applied to the input to a second digit from the least significant digit determination circuit.

Each stage of the partial arithmetic unit produces a partial product or a partial remainder for the multiplying or the dividing process, respectively, by adding to or subtracting from the output of the preceding stage of the partial arithmetic unit the product of the coefficient and the multiplicand in the multiplying process or the divisor in the dividing process wherein the multiplicand or divisor is designated as a fixed number.

The arithmetic processor also includes circuitry wherein the output of the preceding stage of the partial arithmetic unit of the coefficient determination circuits and the signal which represents the lowest digit of the fixed number are added for obtaining the second digit from the least significant digit, thereby eliminating the necessity for obtaining the least significant digit in each stage of the partial arithmetic unit which simplifies and reduces the circuitry required.

The invention also includes an arithmetic processor which utilizes a signed digit expression for internal arithmetic operations, where each digit is expressed by either 1, 0, or $-1$. The processor uses a signal processing circuit including a parity circuit, or exclusive logical sum circuit or its negation circuit, for processing a signal representing the negation of either the logical product or logical sum of a signal A, which represents each digit of a binary number, and a signal B, which represents each corresponding digit of another binary number to the signal A, to obtain each of the digits for the signed digit expression from the said two binary numbers. Specifically, a NAND or NOR circuit and an exclusive NOR or exclusive OR circuit are provided for each digit of two binary numbers.

BRIEF DESCRIPTION OF THE DRAWINGS

FIG. 6 is a circuit diagram of a cell for determining the most significant digit in the partial remainder determination circuit;

FIG. 7 is a circuit diagram of a cell for generating each digit in the initial stage of the partial remainder determination circuit; and FIG. 8 is a circuit diagram of a quotient determination circuit.

DETAILED DESCRIPTION OF THE PREFERRED EMBODIMENT

In the prior art referred to above, the shift subtract division system for a high speed divider or multiplier was proposed using ECL logic which has NOR and OR functions performed simultaneously. However, little consideration was given to the reduction of the number of transistor elements and the possibility of circuit construction using MOS technology. Accordingly, a very large number of gates were required, particularly as the number of arithmetic digits increase. This property of the prior art system practically eliminates the possibility of implementating that system on a VLSI chip together with dividers, multipliers, and ALU.

By using partial arithmetic processing in accordance with the present invention, arithmetic processing for the least significant digit in each partial process can be carried out by one stage while arithmetic processing for the second digit from the least significant digit can be carried out simultaneously by the partial arithmetic processing circuitry in the succeeding stage. By using this improved system, the arithmetic processing circuits for the least significant digit in each partial arithmetic processing circuit (and the corresponding substantial amount of circuitry) can be eliminated. Furthermore, by use of a signed digit expression digit generator in accordance with the invention, the arithmetic processing of two binary numbers, for instance, a subtraction and its redundant binary conversion, can be carried out simultaneously, resulting in higher speed arithmetic processing, together with the benefits of the reduction in circuitry.

Figure 1:
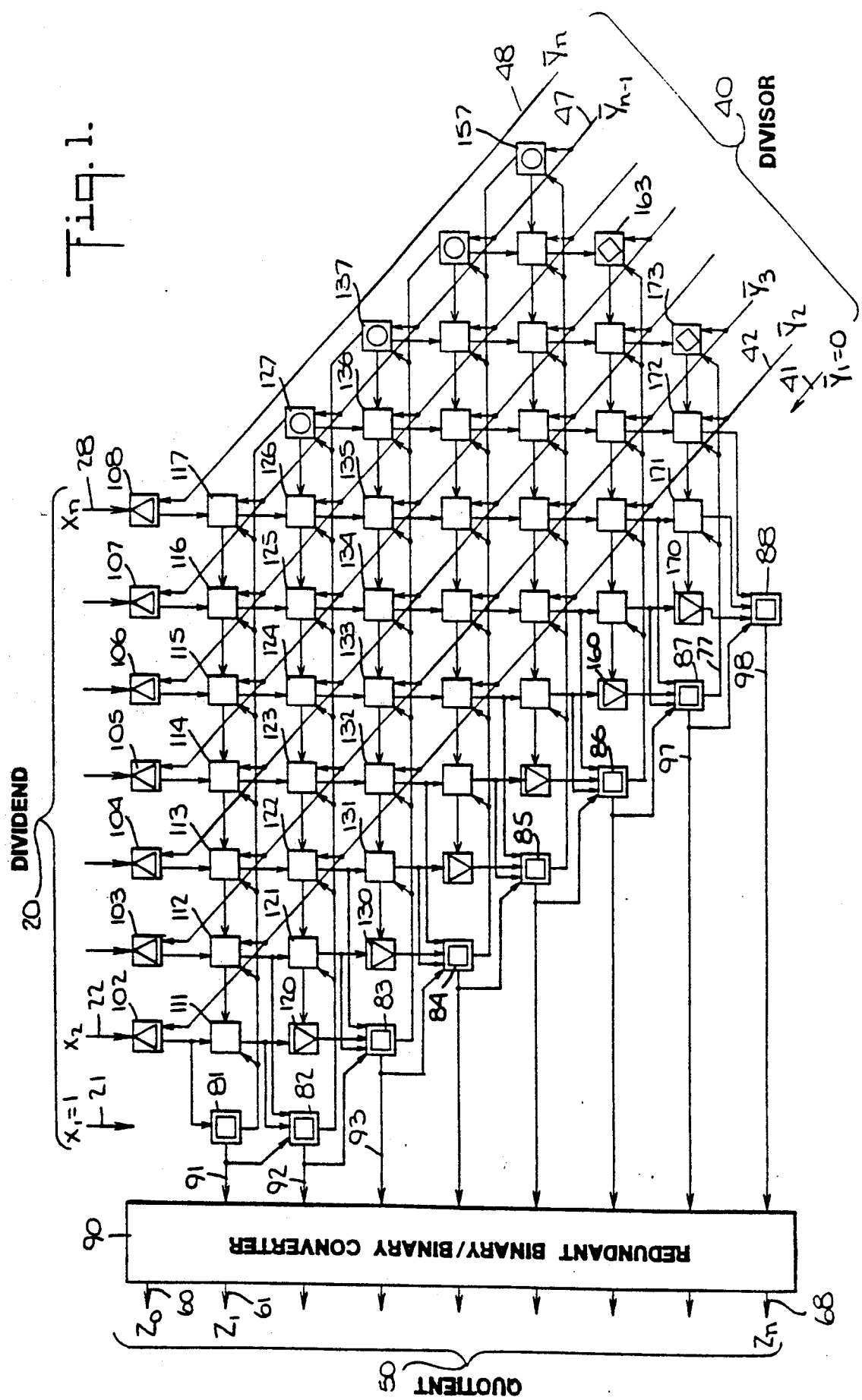
FIG. 1 is a block diagram showing the divider system embodying the partial remainder determination circuit of the present invention.

FIG. 1 is a block diagram showing one embodiment of this invention and illustrates a divider 10 embodying a partial remainder determination circuit. By way of example, the division of an unsigned n digit, radix r fraction is illustrated for the case where n=8, r=2. The dividend $[0.X_1X_2...X_n]_2$, 20, is converted into signals $X_1 21, X_2 22, ... X_n, 28$, which are a first group of inputs to divider 10 (wherein the signal Xn corresponds to the nth digit from the radix point). The divisors $[0.Y_1Y_2...Y_n]_2$, 40, are converted into the signal $\overline{Y}_1 41, \overline{Y}_2 42, ... \overline{Y}_n, 48$, which are a second group of inputs to divider 10 (wherein the signal Yn corresponds to the nth digit from the radix point, and is the logical negation signal of Yn). The quotient $[Z_0Z_1...Z_n]_2$, 50, is the output of divider 10 and is a one digit integer, $Z_0$, and n digits fraction, $Z_1, ... Z_n$, which are represented by signals $Z_0 60, Z_1 61, ... Z_n, 68$. Signal 21 is always "1", i.e., $X_1=1$, and signal 41 is always "0", i.e., $Y_1=0$, as shown in FIG. 1. Signals 21 and 41 are input to a block which is not shown in FIG. 1 since the block always produces the fixed output signal "0". Signal 41 is also input to blocks 111, 121, 131, 141, 151, 161, 171. However, since signal 41 is always "0", and the fixed signal "0" can easily be obtained by connecting the signal line to ground, the connection of signal 41 to these blocks has been omitted.

Divider 10 includes subtraction circuits 102, 103 ... 108 (illustrated with an upwardly facing arrow in each block) which determine one digit of the radix 2 signed digit (hereinafter called the redundant binary number) by subtraction of a binary number, $X_i$, and a binary number $Y_i$. Subtraction circuits 102 ... 108, respectively, subtract the divisor $[0.Y_1Y_a ... Y_n]_2$ from the dividend $[0.X_1X_2...Xn]_2$ to determine an initial partial remainder.

Divider 10 also includes partial remainder determination circuits, including circuits for determining the most significant digit, represented by blocks 120, 130 ... 170 (having an internal downwardly directed arrow); redundant binary addition and subtraction circuits for determining the intermediate digits, represented by blocks 111–117, 121–126, ... 171, 172 (having no internal symbol), circuits for determining the second digit from the least significant digit, represented by blocks 127, 137, 147 and 157 (having an internal circle) and redundant binary addition and subtraction circuits for generating the intermediate carry signal, represented by blocks 163, 173 (having an internal diamond). Divider 10 also includes quotient determination circuits, represented by blocks 81–88 (having an internal square).

The partial remainder after the determination of the j-th digit from the radix point of the quotient, $A^{(j+1)}$, is determined from a partial remainder $A^{(j)}$ derived from each partial remainder determination circuit, and signals $\overline{Y}_1, 41, \overline{Y}_2, 42, ..., \overline{Y}_n, 48$, which represent the logical negation of each digit of the divisor, and the 2 bit signal 71, 72, ... 77, which are the outputs of the quotient determination circuits 81–87 of this stage.

Redundant binary/binary converter 90 executes the following equation:

$$Q\left(=\sum_{i=0}^{n} q_i \cdot 2^i\right) = Q^+\left(=\sum_{a_i=1} a_i \cdot 2^i\right) -$$

$$Q^-\left(=\sum_{a_i=-1}(-a_i) \cdot 2^i\right)$$

where $a_i \epsilon (-1, 0, 1)$ and each digit $Q^+$ and $Q^- \epsilon (0, 1)$. That is, the quotient of redundant binary representation, Q, can be changed to a binary number by subtracting two binary numbers $Q^+$ and $Q^-$. Redundant binary converter 90 can be easily realized by using a conventional ripple-carry addition circuitry or carry-look-ahead addition circuitry.

The overall method for arithmetic processing using partial remainder determination implemented in accordance with this invention will now be more fully described.

When the j th digit, $q_j$, from the radix point of a quotient is determined, the partial remainder, $R^{(j)}$, after the determination of $q_j$ is expressed by the following recurrence formula:

$$R^{(j+1)} = 2 \times R^{(j)} - q_j \times Y$$

where Y is a divisor, or $Y = [0.Y_1Y_2 ... Y_n]_2 A^{(j)}$, which is equal to the partial remainder $R^{(j)}$, except for the sign, is defined by the following formula:

$$A^{(j+1)} = p^{(j)}(2 \times R^{(j)}) + D^{(j)} \tag{1}$$

where $P^{(j)}$ is a function which reverses the sign according to the value of $q_j$, and $D^{(j)} = |q_j| \times Y$ where $|q_j|$ is the absolute value of $q_j$. $A^{(j)}$ is also referred to herein as the partial remainder.

The method for determining the j-th digit, qj, from the radix point of the quotient and the partial remainder $A^{(j+1)}$, in the case where the partial remainder $A^{(j)} = [a_0^j.a_1^j a_2^j ... a_n^j]SD_2$ and the j−1 th digit, $q_{j-1}$, from the radix point of the quotient, which have already been determined, will now be explained. The j th digit, $q_j$, from the radix of the quotient is determined from the first three digits of the partial remainder $A^{(j)}$, that is, $[a_0^j,$ $a_1{}^j a_2{}^j]SD_2$, and the j−1 th digit, $q_{j-1}$, from the radix point of the quotient in the j th stage quotient determination circuit, 81, ... 88. In accordance with the sign of the first three digits of the partial remainder, i.e., positive, 0, or negative, the jth digit, $q_j$, from the radix of the quotient is defined as $q_j=\text{sign}\ (-q_{j-1})$, $q_j=0$, or $q_j=-\text{sign}\ (-q_{j-1})$, respectively. However, sign $(-q_{j-1})$ is defined as follows:

$$\text{sign}\ (-q_{j-i}) = \begin{cases} 1\ (\text{for}\ q_{j-1} < 0) \\ 1\ (\text{for}\ q_{j-1} = 0) \\ -1\ (\text{for}\ q_{j-1} > 0) \end{cases}$$

Each digit $X_i$ in $[X_0X_1 \ldots X_n]_{SD2}$ is expressed by $[-1, 0, 1]$, and $[X_0.X_1 \ldots X_n]_{SD2}$ is equal to the following expression:

$$\sum_{i=0}^{n} x_j \times 2^{-i}$$

The partial remainder $A^{(j+1)}$ is determined by carrying out processing of the following using the j th circuit in each partial remainder determination circuit, providing that in equation (1) above:

$$A^{(j+1)} = P^{(j)}(2 \times P^{(j-1)}(A^{(j)}), + D^{(j)}$$

the first term is conditioned as follows:
(i) when sign $(-q_{j-1}) \times$ sign $(-q_j) = 1$, $$P^{(j)}(2 \times P^{(j-1)})) = [a_0{}^j a_1{}^j . a_2{}^j \ldots a_n{}^j 0]_{SD2}$$

(ii) and when sign $(-q_{j-1}) \times$ sign $(-q_j) = -1$, $$P^{(j)}(2 \times P^{(j-1)}(A^{(j)})) = [\overline{a_0{}^j a_1{}^j}. a_2{}^j \ldots a_n{}^j 0]_{SD2}$$

and the second term is conditioned as follows:
and the second term is
(i) when $q_j \neq 0$, $D^{(j)} = [0.y_1y_2 \ldots yn]_{SD2}$
(ii) when $q_j = 0$, $D^{(j)} = 0.00 \ldots 0]_{SD2}$
and each digit is the non-negation of a redundant binary number. However, since $a_i{}^j$ is equivalent to $-a_i{}^j$, the partial remainder determination circuit can be realized by redundant binary addition and subtraction circuits for a redundant binary number and a binary number (or all of the digits are the non-negation redundant binary number). In this case, each control signal 71, ..., 77 for the partial remainder determination circuits is determined by the magnitude of $q_j$ which corresponds to each quotient and by the sign of $-q_j$ and $-q_{j-1}$.

In order to perform carry-propagation-free addition of a redundant binary number and a binary number in the partial remainder determination circuits, the intermediate sum digit has to be determined according to the rules shown by Table 1, below, and the intermediate carry has to be determined according to the rules shown by Table 2, below. This means that addition where no carry propagation takes place can be realized by adding the intermediate sum digit determined according to Table 1 and the intermediate carry from the lower digit according to Table 2. The addition of a redundant binary number and the binary number always follows this rule of addition.

TABLE 1

| | Intermediate Sum Digit | | |
|---|---|---|---|
| | augend (redundant binary number) | | |
| | −1 | 0 | 1 |
| addend | 0 | −1 | 0 | −1 |
| (binary) | 1 | 0 | −1 | 0 |

TABLE 2

| | Intermediate Carry | | |
|---|---|---|---|
| | augend (redundant binary number) | | |
| | −1 | 0 | 1 |
| addend | 0 | 0 | 0 | 1 |
| (binary) | 1 | 0 | 1 | 1 |

A redundant binary number is converted into a binary signal by the following process. One digit of the partial remainder $a_i{}^j$, and one digit of the quotient, $q_j$, is expressed the binary signals $a_{i+}{}^j$, $a_{i-}{}^j$, and $q_{j+}$, $q_{j-}$, respectively wherein −1, 0 and 1 are expressed by 11, 10, and 01, respectively, and $i = 0, 1, \ldots n$, and $j = 1, \ldots n$.

The magnitude and the sign of the j th digit, $q_j$, from the radix point can be expressed by $q_{j-}$ and $q_{j+}$. The signal, $t_j$, provides the difference in the sign between the j th digit, $q_j$, from the radix point and the j−1 th digit, $q_{j-1}$. This means that $t_j=0$ if a sign difference exists (i.e., if sign $(-q_j) \times$ sign $(-q_{j-1}) = -1$), and $t_j=1$, if there is no sign difference (i.e., if sign $(-q_j) \times$ sign $(-q_{j-1}) = 1$). Therefore, $t_j$ can be determined by the following expression:

$$t_j = a_0+{}^j \cdot (a_0-{}^j + a_1+{}^j) \cdot (a_0-{}^j + a_1-{}^j + a_2+{}^j) \\ \cdot (a_0-{}^j + a_1-{}^j + a_2-{}^j + q_{j-1+})$$

and $q_{j-}$ and $q_{j+}$ can be expressed as follows:

$$q_{j-} = a_0-{}^j + a_1-{}^j + a_2-{}^j$$

$$q_{j+} = (a_0+{}^j + (a_0-{}^j + a_1+{}^j) + (a_0-{}^j + a_1-{}^j + a_2+{}^j) \oplus (q_{j-1+} + q_{j-})$$

where $\cdot$ is the logical product (AND), $+$ is (OR), and $\oplus$ is the exclusive OR (Ex-OR) operators, and $a_1-{}^j a_{k+}$ and $q_{j-}$ means $+a_2-{}^j + a_2+{}^j$ and the logical negation of $q_{j-}$, respectively. Furthermore, in the addition and the subtraction of the digit $a_{1+}{}^j$ of the partial remainder produced by the previous stage partial remainder determination circuit and the digit $d^j$ of the addend (i.e., $|q_j| \times y_i$), the intermediate sum digit $S^j$ (representing negative value) and the intermediate carry $C^j$, can be expressed by the following logical equations as follows:

$$d_i{}^j = y_i \cdot q_{j-} \quad s_i{}^j = a^j_{i+1-} \oplus d_i{}^j$$
$$c_i{}^j = (a^j_{i+1+} \oplus t_j) \cdot a^j_{i+1-} + d_i{}^j \cdot a^j_{i+1-}$$

The digit $a_i{}^{j+1}$ of the partial remainder in this addition or subtraction process can be expressed by the following equations, respectively:

$$a_{i+}{}^{j+1} = s_i{}^j + c_{i+1}{}^j$$

$$a_{i-}{}^{j+1} = s_i{}^j \oplus c_{i+1}{}^j$$

where $i = 1, \ldots n-2$, $j = 1, \ldots n-1$, and $S^j=1$, or $S^j=0$ if the intermediate sum digit is −1 or 0, respectively.

Figure 2:
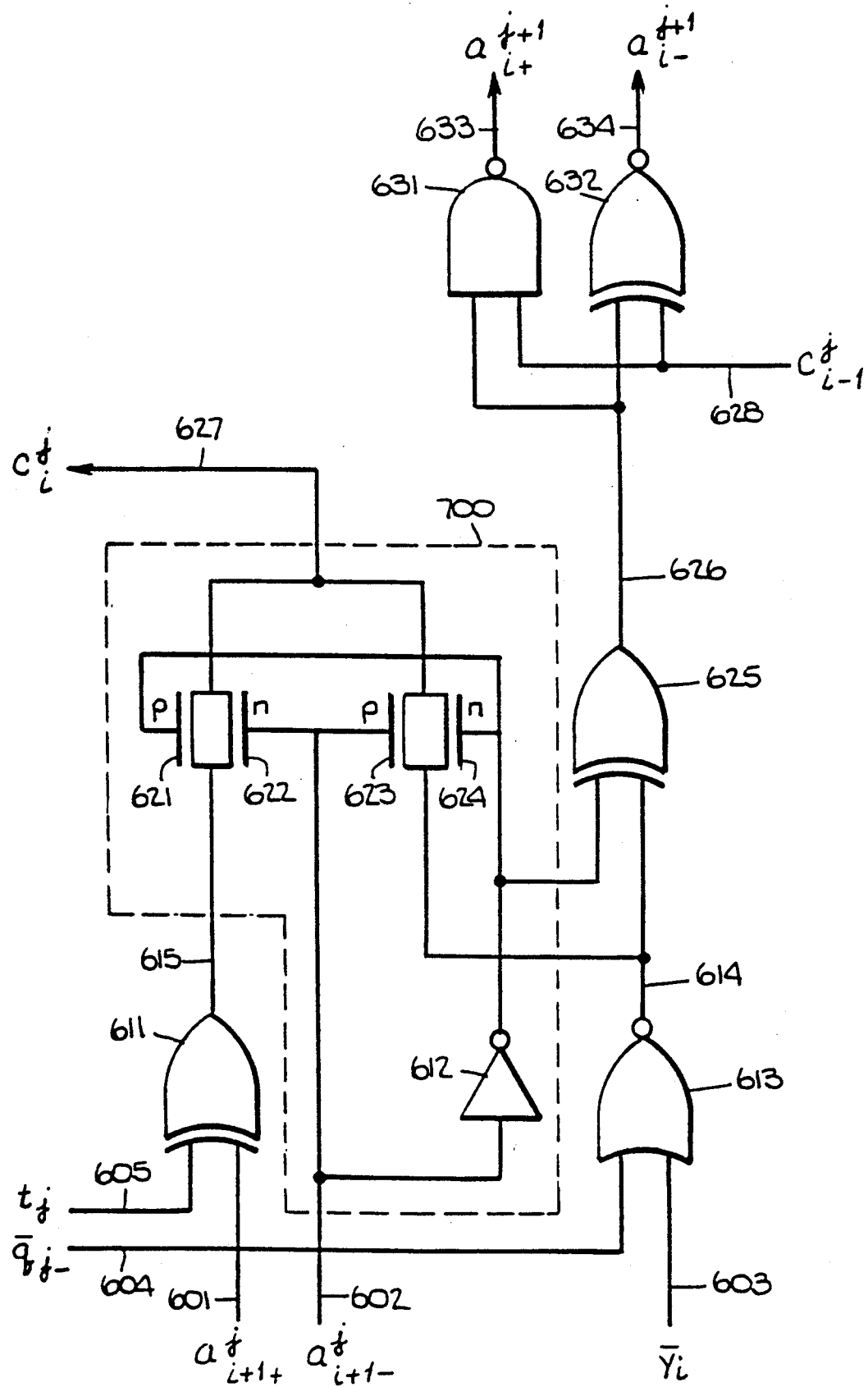
FIG. 2 shows a circuit for a redundant addition and subtraction cell for the intermediate digit determination in the partial remainder determination circuit shown by FIG. 1.

FIG. 2 shows one embodiment of a circuit for realizing the redundant addition and subtraction cells 111, ...

117, 121, ..., 126, 131, ... 136, 141 ... 146, 151 ... 156, 161, 162, 164, 165, 171, 172 for each intermediate digit in the partial remainder determination circuit shown in FIG. 1. In FIG. 2, gates 611 and 625 are exclusive OR circuits, gate 612 is an inverter circuit, gate 613 is a two-input NOR circuit, gate 631 is the two-input NAND circuit, and gate 632 is an exclusive NOR circuit. P-channel transistor 621, n-channel transistor 622, p-channel transistor 623 and n-channel transistor 624 constitute a transfer-gate.

$a_{i+1+}{}^j$, 601 and $a_{i+1-}{}^j$, 602, are the two-bit signals each representing the i+1 th digit, $a_{i+1}{}^j$, from the radix point of the partial remainder before the jth digit $q_j$ of the quotient is determined. The logical negation, $\overline{Y}_i$, 603, of the i th digit, $Y_i$, from the radix point of the divisor is one of the signals, 42, ... 47, of FIG. 1. $\overline{q_{j-}}$, 604, and $t_j$, 605, constitute the two-bit control signals, 71, ... 77. The product, $|q_j| \times Y_i$, that is, of the magnitude $q_j$ of the quotient and the divisor, $Y_i$, appears on line 614 and corresponds to the addend in the redundant addition process. The signals on lines 615 and 602 provide information for compilation of the augend in the redundant addition process.

Signal $\overline{S_i{}^j}$ appears on line 626 and represents the logical negation of the intermediate sum digit $S_i{}^j$. The signal, $C_i{}^j$, appears on line 627, represents the intermediate carry, and is a one-bit signal. The signal $C_{i+1}{}^j$, which appears on line 628, is a one-bit signal which represents the intermediate carry from the (i+1) th digit from the radix point, i.e. from the lower digit. The outputs $a_{i+}{}^{j+1}$, on line 633, and $a_{i-}{}^{j+1}$, on line 634, are two-bit signals which represent the i th digit from the radix point of the partial remainder after the digit $q_j$ of the quotient has been determined.

The product $|q_j| \times Y_i$ which is the addend appearing on line 614 is determined by NOR circuit, 613. The sign inversion of the partial remainder, which is the augend, is performed by the exclusive OR circuit, 611, and the transfer-gates, 621 and 622. The intermediate sum digit determination is carried out by the exclusive OR gate 625. The intermediate carry determination is accomplished by inverter 612, transfer-gates 621 and 622, and transfer-gates 623 and 624. The determination of the partial remainder of the total sum is performed by the NAND circuit 631 and the exclusive NOR circuit 632.

Figure 3:
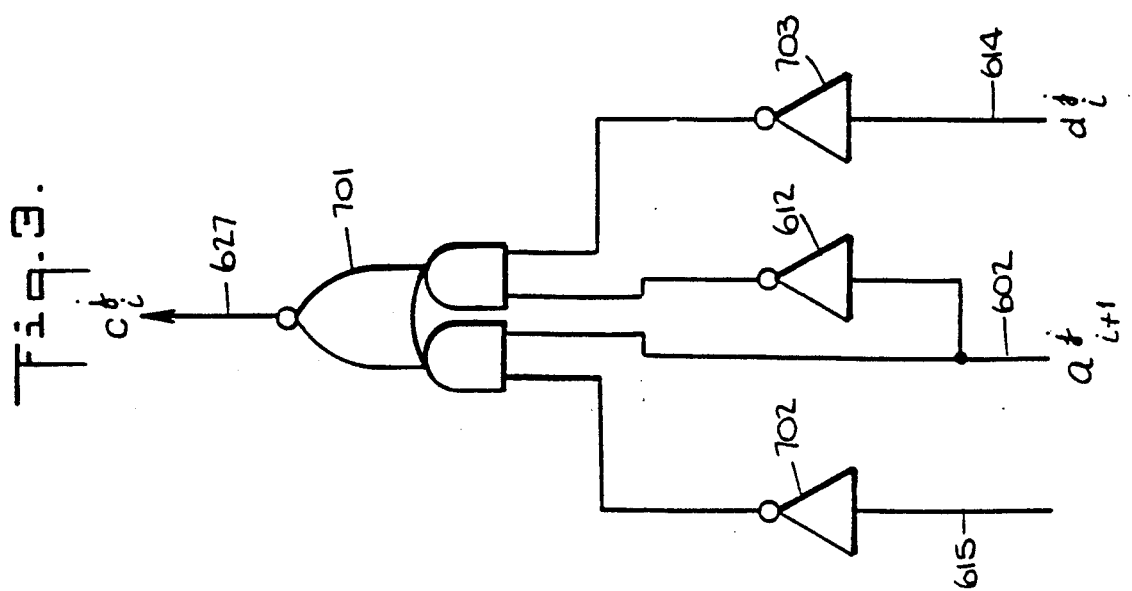
FIG. 3 is a circuit diagram of the transfer-gate of the addition and subtraction cell shown in FIG. 2.

In the embodiment shown in FIG. 2, transfer-gates 621, 622, 623 and 624 are used. However, the same function can be performed by using other circuitry. For example, FIG. 3 is an example where the circuit indicated within dotted block 700 (FIG. 2) is constructed of AND-NOR compound gates. Gate 701 is a four input NAND-NOR compound gate, and gates 702, 703 and 612 are inverter circuits. It is also possible to replace the inverter circuits 702 or 703 by exclusive NOR or exclusive NAND circuits by combining each of them with the exclusive OR circuit 611 (FIG. 2) or the NOR circuit 613 (FIG. 2).

The methods by which the most significant digit, $a_0{}^j$, and the second digit from the least significant digit, $a_{n-1}{}^j$, are determined will now be explained. For the determination of the most significant digit, $a_0{}^j$, $Y_0$ always equals 0. When $a_{1-}{}^j0$, the sign of the augend is negative, or $a_{1+}{}^j \oplus t_j = 1$, the intermediate sum digit $S_0{}^j$ and the intermediate carry $C_0{}^j$ are expressed as follows:

$$S_0{}^j = a_{1-}{}^j, \ C_0{}^j = 0$$

The most significant digit $a_0{}^j$ of the partial remainder is determined by the following logical formulas:

$$a_{0+}{}^{j+1} = S_0{}^j + C_1{}^j, \ a_{0-}{}^{j+1} = S_0{}^j \oplus C_1{}^j$$

Since $a_{n+1}{}^{j-1}$ always equals zero, $a_n{}^j$ can be set to either 1 or 0.

$$a_{n+}{}^j = a_{n-}{}^j, \ a_{n-}{}^j = y_n \cdot q_{j-1-}, \ C_n{}^j = 0$$

By using these relationships, the second digit, $a_{n-1}{}^j$, from the least significant digit of the partial remainder can be determined by the following logical formulas (j = 1 ... n−1):

$$d_{n-1}^j = y_{n-i} \cdot q_{j-}, \ s_{n-1}^j = a_n{}^j \cdot d_{n-1}^j$$

$$c_{n-1}^j = t_j \cdot d_{n-}^j + d_{n-1}^j \cdot d_{n-}^j, \ a_{n-1+}^{j+1} = 1, \ a_{n-1-}^{j+1} = s_{n-1}^j$$

Figure 4:
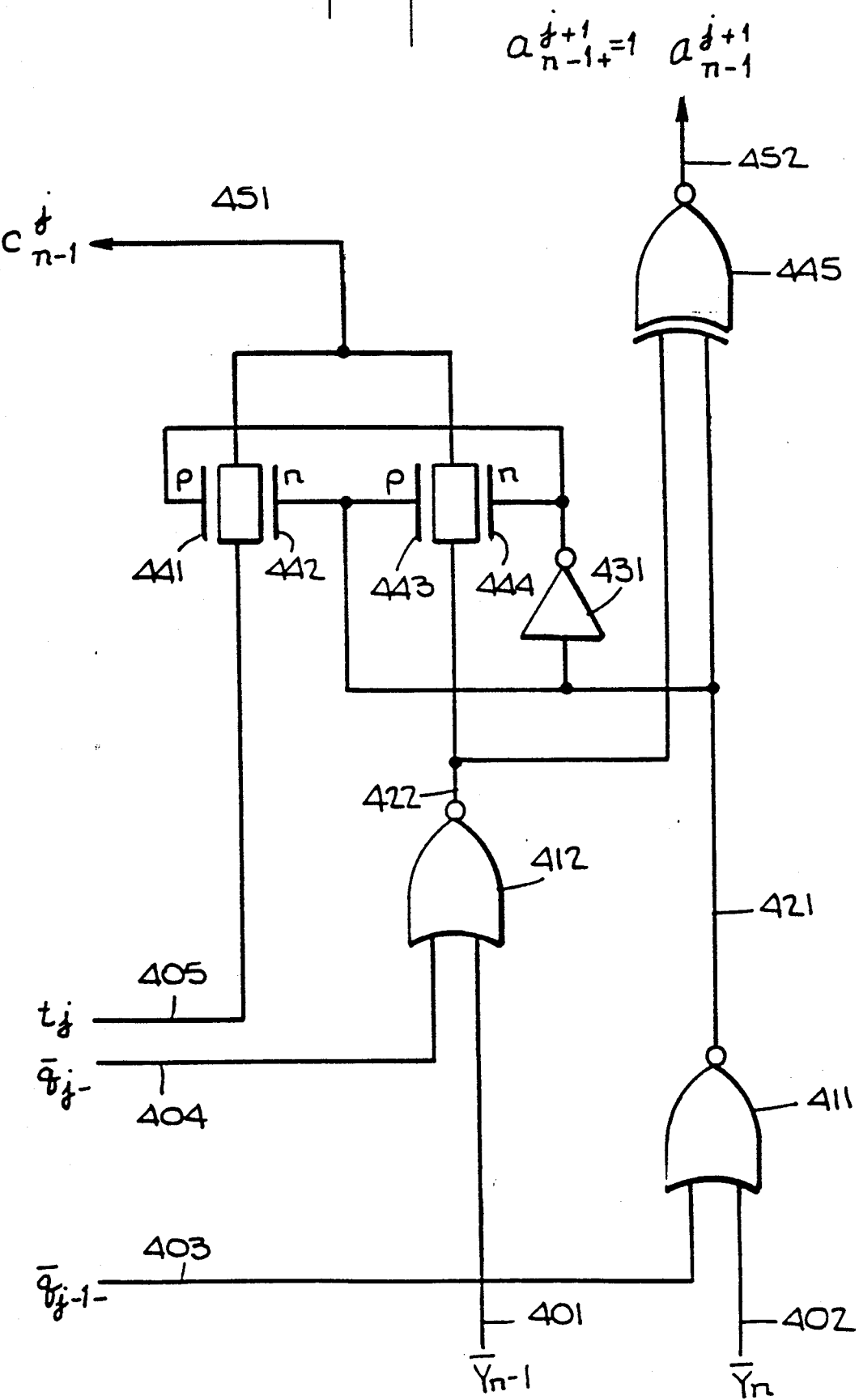
FIG. 4; is a circuit diagram showing one of the cells for determining the second digit from the least significant digit in the partial remainder determination circuit.

FIG. 4 shows an embodiment of a circuit for realizing the redundant addition and subtraction cells 127, 137, 147, 157 for determining the second digit from the least significant digit in the partial remainder determination circuit shown in FIG. 1. Gates 411 and 412 are two-input NOR circuits, gate 431 is an inverter circuit, and gate 445 is an exclusive NOR circuit. P-channel transistor 441, n channel transistor 442, p-channel transistor 443 and n channel transistor 444 each constitute a transfer-gate.

Signal $\overline{Y}_{n-1}$, 401, is the logical negation signal 47 of the n−1 th digit from the radix point of the divisor shown in FIG. 1, and signal $\overline{Y}_n$, 402, is the logical negation signal 48 of the n th digit from the radix point. Signal $q_{j-1-}$, 403, is the logical negation of the signal which represents the magnitude of the quotient, $q_{j-1}$, among the two-bit signals 71, ..., 77 from the j−1 th quotient determination circuit shown in FIG. 1. Signals $\overline{q_{j-}}$, 404, and $t_j$, 405, are the two-bit control signals 71, ..., 77 from the j th quotient determination circuit shown in FIG. 1. Signal 421 is the one-bit signal $a_{n-}{}^j$ from the two bit signals which represent the least significant digit $a_n{}^j$ of the partial remainder, and signal 422 is the signal $d_{n-1}{}^j$ which represents the product $|q_j| \times Y_{n-1}$ which becomes the addend. Signal $C_{n-1}{}^j$, 451, represents the intermediate carry from the n−1 th digit from the radix point. The output $a_{n-1-}{}^{j+1}$, 452, is a one-bit signal which represents the magnitude among the two-bit signals which represents the n−1 th digit, $a_{n-1}{}^{j+1}$, from the radix point of the partial remainder after the quotient $q_j$ is determined. Since the value of $a_{n-1}{}^{j+1}$ is either −1 or 0 in accordance with the intermediate sum digit addition rule shown in Table 1, $a_{n-1+}{}^{j+1}$ always equals 1.

In FIG. 4, the determination of the product $|q_j| \times Y_{n-1}$ which becomes the addend, is performed by the NOR circuit 412. The determination of the least significant digit $a_n{}^j$ of the partial remainder before the digit $q_j$ of the quotient is determined carried out by the NOR circuit 412. The determination of the signal $C_{n-1}{}^j$ which represents the intermediate carry, is carried out by transfer-gates 441, 442, 443 and 444, and the inverter circuit 431. The determination of the signal $S_{n-1}{}^j$ which represents the intermediate sum digit, that is, the n−1 th digit $a_{n-1}{}^{j+1}$ from the radix point of the partial remainder, is carried out by the exclusive NOR circuit 445. Although transfer-gates are shown in this embodiment, compound gates such as shown in FIG. 3 can also be used.

Figure 5:
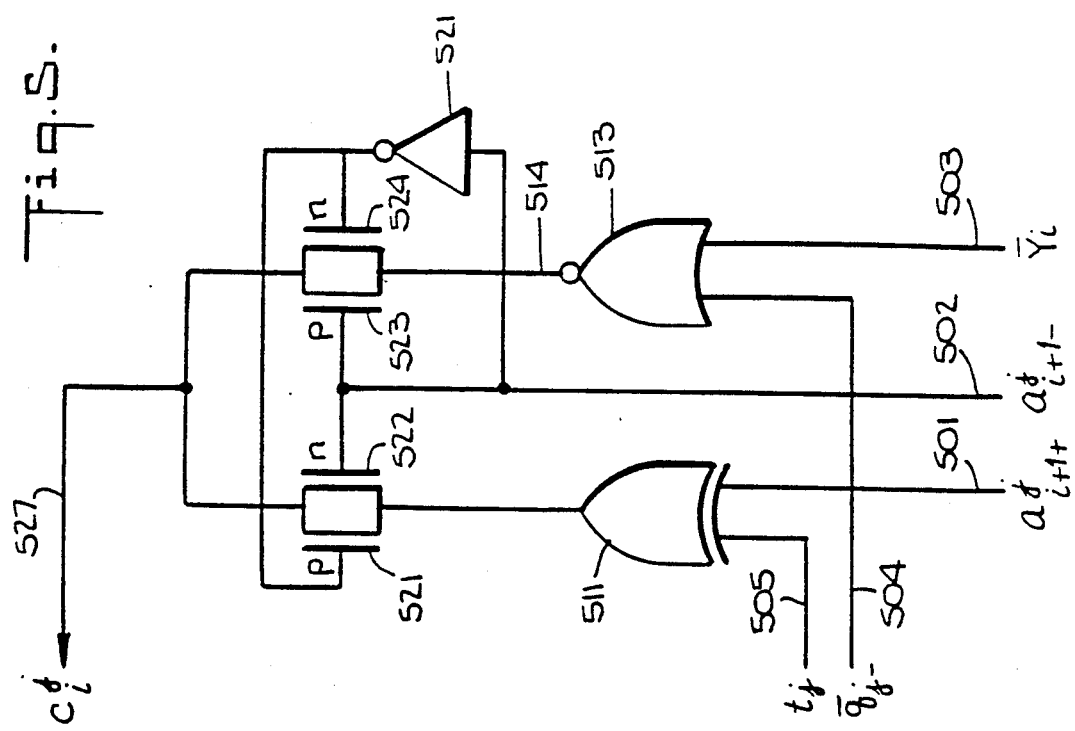
FIG. 5 is a circuit diagram of a cell which generates the intermediate digit carry signal in the partial remainder determination circuit.

FIG. 5 shows an embodiment of each redundant addition and subtraction cell 163, 173 which generates the intermediate carry digit in the partial remainder determination circuit shown in FIG. 1. The circuits of FIG. 5 are the same as the portion of the circuit of FIG. 2 which relates to the intermediate carry determination. Gates 511, 512, and 513 in FIG. 5 correspond to gates 611, 612, and 613 in FIG. 2, and gates 521, 522, 523 and 524 are identical in performances with 621, 622, 623, and 624 of FIG. 2. Signals $a_{i+1+}{}^j$, 501, $a_{i+1-}{}^j$, 502, $\overline{Y}_i$, 503, $\overline{q}_{j-}$, 504, $t_j$, 505, $d^j$, 514, and $C^j$, 527, correspond to the signals 601, 602, 603, 604, 605, 614, and 627 in FIG. 2, respectively.

FIG. 6 shows an embodiment of a circuit for the redundant addition and subtraction cells 120 ... 170 for determining the most significant digit in the partial remainder determination circuit shown in FIG. 1. Gate 221 is a two-input NAND circuit and the gate 222 is an exclusive NOR circuit. Signal 201 is the one-bit signal $a_{1-}{}^j$ which represents the magnitude among the two-bit signals which represent the first digit $a_{1-}{}^j$ from the radix point of the partial remainder before the digit $q_j$ of the quotient is determined. Signal 202 is the one-bit signal $C^j$ which represents the intermediate carry from the first digit from the radix point. The output signals 231 and 232 are the two-bit signals $a_{0+}{}^{j+1}$ and $a_{0-}{}^{j+1}$ which represent the most significant digit (i.e the first digit of the integer) of the partial remainder after the digit $q_j$ of the quotient is determined. Signal 203 represents the logical negation $\overline{a_{1-}{}^j}$ of the signal $a_{1-}{}^j$, 201.

The circuit of FIG. 6 determines the sign, $a_{0+}{}^{j+1}$, and the magnitude (absolute value), $a_{0-}{}^{j+1}$, of the redundant binary number by subtracting the binary number, $a_{1-}{}^j$, which represents the absolute value of the first digit from the radix point of the partial remainder, from the one bit binary number $C^j$ which represents the intermediate carry.

FIG. 7 is an example of the redundant subtraction cells 102, ..., 108, wherein the initial partial remainder is determined by subtracting the divisor for each digit from the dividend. FIG. 7 is functionally identical to the circuit shown by FIG. 6. Gates 321 and 322 correspond to the NAND circuit 221 and the exclusive NOR circuit 222 in FIG. 6, and the signals 302, 303, 331 and 332 correspond to the signals 202, 203, 231 and 232, respectively. Signal 302 in FIG. 7 represents the digit $X_i$ of the dividend and signal 303 is the logical negation of the digit $Y_i$ of the dividend. Signals 331 and 332 are the two-bit signals $a_{i+}{}^1$ and $a_{i-}{}^1$ which represent the digit $a_i{}^1$ of the initial partial remainder (or the redundant binary number).

FIG. 8 is an embodiment of each quotient determination circuit, 81, ..., 88. Gate 811 is an inverter circuit, gates 813 and 823 are two-input NOR circuits, gates 814, 815 and 822 are three-input NOR circuits, gates 812 and 821 are the four-input NOR circuits, and gate 831 is an exclusive NOR circuit. Signals $a_{0+}{}^j$, 801, and $a_0{}^j$, 802, are the two-bit signals which represent the most significant digit of the partial remainder before the digit $q_j$ of the quotient is determined. Signal $a_{1+}{}^j$, 803, and $a_{1-}{}^j$, 804, are the two-bit signals which represent the first digit $a_1{}^j$ from the radix point of that partial remainder, and $a_{2+}{}^j$, 805 and $a_{2-}{}^j$, 806 are the two-bit signals which represent the second digit from the radix point of the partial remainder. The input, $q_{j-1+}$, 807, is the one bit among the two-bit signals 91, ..., 98, which represents the quotient digit obtained by the quotient determination circuit. The outputs $q_{j+}$, 832, and $q_{j-}$, 833, are the two-bit signal which represents the j th digit from the radix point of the quotient. The outputs $q_{j-}$, 833, and $t_j$, 834, are the two-bit signals which appear on lines 71 ... 77 and control each of the partial remainder determination circuits.

The determination of the j th digit, $q_j$, from the radix point of the quotient is performed by the inverter circuit 811, the NOR circuits 813, 814, 815, 822 and 823, and the exclusive NOR circuit 831. The determinations of the control signals $t_j$ and $q_{j-}$ are performed by inverter circuit 811 and NOR circuits 812, 813, 814, 821, and 815. In addition, the inverter circuit 811, and the NOR circuits 813, 814, and 815 are utilized in the determination of each digit $q_j$, 91, ..., 98 of the quotient and each control signal $t_j$ and $q_{j-}$, 71, ... 77.

In the embodiment described above, the partial remainder $a^j$ and the quotient $q_j$ are assigned identical signs in their binary coding. However, different signs can also be assigned. Further, only the process of adding the redundant binary number and the binary number has been specifically described. However, as a worker skilled in this art would readily understand, the subtraction process is similar and need not be described in detail.

When exclusive OR and NOR circuits, each consisting of 6 transistors, are used, the redundant addition and subtraction cell of FIG. 2 consists of 32 transistors and three gate stages are required for the critical path. In the quotient determination circuit of FIG. 8, 50 transistors are used and two gate stages for the critical path are required. The circuit shown by FIG. 4 requires 20 transistors and three gate stages. For the circuit shown by FIG. 7, 10 transistors and one gate stage for the critical path are required.

It is well known that in the circuits described above, the exclusive OR circuits or the NAND circuits, can be replaced by exclusive NOR circuits or the NOR circuit can be constructed of various combinations of inverter circuits, respectively. The compound gate can be constructed of combinations of NAND and NOR circuits and the transfer-gates can be constructed using compound gates, as shown in FIG. 3. The reverse of these constructions are also possible.

In the present embodiment, illustrations are made using a divider circuit constructed by binary logic CMOS technology. However, the present invention can also be realized by other semiconductor technologies such as NMOS, ECL, and TTL, and other higher radix logic. Further, as will readily be understood by a worker skilled in this art, the present invention can also be used to form a multiplier.

In the present embodiment, the divider constructed by CMOS technology provides a delay time for obtaining each digit of the quotient equivalent to five gates. The present redundant addition and subtraction cell constructed of approximately 32 transistors, and the quotient determination cell constructed of approximately 50 transistors represents a saving of approximately 90 transistors for one digit of the quotient and a reduction of the total processing time (the number of gate stage) by three stages. Therefore, the present invention is effective for the substantial reduction of the number of divider circuit elements, making VLSI design easier and processing time higher.

According to the present invention, (1) reduction of the processing system for the least significant digit in the shift subtract division can be carried out, and, (2) the binary/redundant/binary conversion can be carried out simultaneously with the subtracting operation. Therefore, in summary, the present invention is particularly effective to:

(1) substantially reduce the number of circuit elements in the arithmetic processing unit;
(2) provide high speed processing of the internal arithmetic operation (for example, addition and subtraction) since constant and high speed processing can be carried out independent of the number of digits;
(3) simplify the circuit construction; and
(4) provide easier LSI implementation and cost reduction.

What has been described is the presently preferred embodiment of the invention. It will be understood by those skilled in this art that many modifications can be made to the circuitry described herein without departing from the intent, spirit and scope of this invention, which is set out in the claims.

What is claimed is:

1. An arithmetic processing unit comprising:
   a) a plurality of arithmetic circuits, the $i^{th}$ of which receives a 1-bit signal $x_i$ which represents the $i^{th}$ digit of a binary minuend and the logical negation $\overline{Y}_i$ of 1-bit signal $y_i$ which represents the $i^{th}$ digit of a binary subtrahend as two inputs, and determines therefrom and outputs a 2-bit signal $z_i^1$ and $z_i^2$, which represents the $i^{th}$ digit of the difference as a signed-digit binary number, where $z_i^1 = x_i + \overline{Y}_i,$ $z_i^2 = x_1 \cdot y_i + x_1 \cdot y_i,$ and b) a plurality of signed-digit binary adders, the $i^{th}$ of which receives said 2-bit signal $z_i^1$ and $z_i^2$ as one of two inputs, and outputs the $i^{th}$ digit of a second signed-digit binary number, wherein said plurality of arithmetic circuits perform both a subtraction and a conversion from an ordinary binary number to a signed-digit binary number.

2. An arithmetic processing unit comprising:
   a) a plurality of arithmetic circuits, the $i^{th}$ of which receives a 1-bit signal $x_i$ which represents the $i^{th}$ digit of a binary minuend and a 1-bit signal $y_i$ which represents the $i^{th}$ digit of a binary subtrahend as two inputs, and determines therefrom and outputs a 2-bit signal $z_i^1$ and $z_i^2$, which represents the $i^{th}$ digit of the difference as a signed-digit binary number, where $z_i^1 = x_i + y_i,$ $z_i^2 = x_i \cdot y_i + x_i \cdot y_i,$ and b) a plurality of signed-digit binary adders, the $i^{th}$ of which receives said 2-bit signal $z_i^1$ and $z_i^2$ as one of the two inputs, and outputs the $i^{th}$ digit of a second signed-digit binary number, wherein said plurality of arithmetic circuits perform both a subtraction and a conversion from an ordinary binary number to a signed-digit binary number.

* * * * *

UNITED STATES PATENT AND TRADEMARK OFFICE
CERTIFICATE OF CORRECTION

PATENT NO. : 5,031,136
DATED : July 9, 1991
INVENTOR(S) : Tamotsu Nishiyama and Shigeo Kuninobu It is certified that error appears in the above—identified patent and that said Letters Patent is hereby corrected as shown below:

Cover Page,     The prosecution history indicates that this application was assigned Application Serial No. 519,843, which was misprinted as "239,243." "239,243" should be --519,843--;

Cover Page, Title     "UNITS" should be --UNIT--.

Col. 1, line 3     "UNITS" should be --UNIT--;

line 26     "VLSI Oriented" should be --VLSI-Oriented--.

Col. 2, line 54     "FIG. 4; is" should be --FIG. 4 is--.

Col. 3, line 46     "$Y_n$" should be --$\overline{Y}_n$--;

line 48     "$[Z_0 Z_1 \ldots Z_n]_2$" should be --$[Z_0 . Z_1 \ldots Z_n]_2$--;

line 52     "$Y_1=0$" should be --$\overline{Y}_1=0$--;

line 66     "$[0.Y_1 Y_a \ldots Y_n]_2$" should be --$[0.Y_1 Y_2 \ldots Y_n]_2$--.

UNITED STATES PATENT AND TRADEMARK OFFICE
CERTIFICATE OF CORRECTION

PATENT NO. : 5,031,136
DATED : July 9, 1991
INVENTOR(S) : Tamotsu Nishiyama and Shigeo Kuninobu It is certified that error appears in the above—identified patent and that said Letters Patent is hereby corrected as shown below:

Col. 4, line 20 "$\overline{Y}_1,41,\overline{Y}_2,42,\ldots,Y_n,48$" should be
-- $\overline{Y}_1,41,\overline{Y}_2,42,\ldots,\overline{Y}_n,48$ --;

line 38 "Redundant binary" should be
--Redundant binary/binary--;

line 56 "$A^{(j+1)}=P^{(j)}(2\times R^{(j)})+D^{(j)}$" should be
"$A^{(j+1)}=P^{(j)}(2\times R^{(j)})+D^{(j)}$" ;

line 61 "$qj$" should be -- $q_j$ -- ;

line 63 "$A^{(i+1)}$" should be -- $A^{(j+1)}$ -- ;

lines 63, 64 "$A^{(j)-}=[a_c^j.a_1^j a_2^j\ldots a_n^j]SD2$" should be
"$A^{(j)}=[a_0^j.a_1^j a_2^j\ldots a_n^j]_{SD2}$" ;

line 68 and "$[a_c^j,a_1^j a_2^j]SD_2$" should be "$[a_0^j.a_1^j a_2^j]_{SD2}$".
Col. 5, line 1

Col. 5, line 16 "$[X_0 X_1\ldots X_n]_{SD2}$" should be
-- $[X_0.X_1\ldots X_n]_{SD2}$ -- ;

line 21 "$\sum_{i=0}^{n} x_j \times 2^{-i}$" should be "$\sum_{i=0}^{n} x_i \times 2^{-i}$" ;

line 27 "equation (1) above:" should be
--equation (1), above:--;

UNITED STATES PATENT AND TRADEMARK OFFICE
CERTIFICATE OF CORRECTION

PATENT NO. : 5,031,136
DATED : July 9, 1991
INVENTOR(S) : Tamotsu Nishiyama and Shigeo Kuninobu It is certified that error appears in the above-identified patent and that said Letters Patent is hereby corrected as shown below:

Col. 5, line 29    "$A^{(j+1)} = P^{(j)}(2 \times P^{(j-1)}(A^{(j)}), +D^{(j)}$" should be "$A^{(j+1)} = P^{(j)}(2 \times P^{(j-1)}(A^{(j)})) + D^{(j)}$" ;

line 38    "$P^{(j)}(2 \times P^{(j-1)}(A^{(j)})) = [a_0^j a_1^j . a_2^j \ldots a_n^j 0]_{SD2}$" should be "$P^{(j)}(2 \times P^{(j-1)}(A^{(j)})) = [\overline{a_0^j}\,\overline{a_1^j} . \overline{a_2^j} \ldots \overline{a_n^j} 0]_{SD2}$" ;

line 41    "the second term is" should be --the second term is;--;

line 43    "$D^{(j)} = 0.00\ldots 0]_{SD2}$" should be "$D^{(j)} = [0.00\ldots 0]_{SD2}$" .

Col. 6, line 21    "respectively wherein" should be --respectively, wherein--;

lines 41, 42    "$q_{j+} = (a_{0+}^j + (a_{0-}^j + a_{1+}^j) + (a_{0-}^j + a_{1-}^j + a_{2+}^j) \oplus (q_{j-1} + q_{j-})$" should be "$q_{j+} = (\overline{a_{0+}^j} + \overline{(a_{0-}^j + a_{1+}^j)} + \overline{(a_{0-}^j + a_{1-}^j + a_{2+}^j)}) \oplus (q_{j-1} + \overline{q_{j-}})$" ;

line 43    "where • is the logical product (AND), + is (OR), and" should be --where • is AND, + is OR, and--;

UNITED STATES PATENT AND TRADEMARK OFFICE
CERTIFICATE OF CORRECTION

PATENT NO. : 5,031,136  
DATED : July 9, 1991  
INVENTOR(S) : Tamotsu Nishiyama and Shigeo Kuninobu Page 4 of 7

It is certified that error appears in the above—identified patent and that said Letters Patent is hereby corrected as shown below:

Col. 6, lines 44, 45  "$a_{i-}^j \cdot a_{k+}$ and $q_{j-}$ means $+a_{2-}^j + a_{2+}^j$" should be -- $\overline{a_{i-}^j + a_{k+}^j}$ and $\overline{q}_{j-}$ means $a_{i-}^j + a_{k+}^j$ -- ;

line 47  "$a_{i+1}^j$" should be -- $a_{i+1}^j$ -- ;

line 57  "$c_i^j = (a_{i+1+}^j \oplus t_j) \cdot a_{i+1-}^j + d_i^j \cdot a_{i+1-}^j$" should be "$c_i^j = (a_{i+1+}^j \oplus t_j) \cdot a_{i+1-}^j + d_i^j \cdot \overline{a}_{i+1-}^j$" ;

line 62  "$a_{i+}^{j+1} = s_i^j + c_{i+1}^j$" should be

"$a_{i+}^{j+1} = s_i^j + \overline{c}_{i+1}^j$" .

Col. 7, line 24  "$S_i^j$" should be -- $\overline{s}_i^j$ -- ;

lines 25, 26  "digit $S_i^j$. The signal, $C_i^j$," should be

-- digit $s_i^j$. The signal, $c_i^j$, -- ;

line 27  "The signal $C_{i+1}^j$," should be

-- The signal $c_{i+1}^j$, -- ;

line 48  "Performed" should be --performed--;

lines 54, 55  "exclusive NOR or exclusive NAND" should be --exclusive NOR or NAND--;

UNITED STATES PATENT AND TRADEMARK OFFICE
CERTIFICATE OF CORRECTION

PATENT NO. : 5,031,136
DATED : July 9, 1991
INVENTOR(S) : Tamotsu Nishiyama and Shigeo Kuninobu It is certified that error appears in the above—identified patent and that said Letters Patent is hereby corrected as shown below:

Col. 7, line 62    "When $a_{i-}^{j}0$," should be

-- When $a_{i-}^{j} \neq 0$, -- ;

line 63    "sum digit $S_{0}^{j}$" should be

-- sum digit $s_{0}^{j}$ -- ;

line 64    "intermediate carry $C_{0}^{j}$" should be

-- intermediate carry $c_{0}^{j}$ -- ;

line 66    "$S_{0}^{j}=a_{1-}^{j}, C_{0}^{j}=0$" should be "$s_{0}^{j}=\overline{a}_{1-}^{j}, c_{0}^{j}=0$".

Col. 8, line 4    "$a_{0+}^{j+1}=S_{0}^{j}+C_{1}^{j}, a_{0-}^{j+1}=S_{0}^{j}\oplus C_{1}^{j}$" should be "$a_{0+}^{j+1}=s_{0}^{j}+\overline{c}_{1}^{j}, a_{0-}^{j+1}=s_{0}^{j}\oplus c_{1}^{j}$" ;

line 9    "$a_{n+}^{j}=a_{n-}^{j}, a_{n-}^{j}=y_{n}\cdot q_{j-1-}, C_{n}^{j}=0$" should be "$a_{n+}^{j}=\overline{a}_{n-}^{j}, a_{n-}^{j}=y_{n}\cdot q_{j-1-}, c_{n}^{j}=0$" ;

line 18    "$c_{n-1}^{j}=t_{j}\cdot a_{n-}^{j}+d_{n-1}^{j}\cdot a_{n-}^{j},$" should be "$c_{n-1}^{j}=t_{j}\cdot a_{n-}^{j}+d_{n-1}^{j}\cdot \overline{a}_{n-}^{j},$" ;

line 34    "$q_{j-1-}$" should be -- $\overline{q}_{j-1-}$ -- ;

line 44    "$C_{n-1}^{j}$" should be -- $c_{n-1}^{j}$ -- ;

UNITED STATES PATENT AND TRADEMARK OFFICE
CERTIFICATE OF CORRECTION

PATENT NO. : 5,031,136

DATED : July 9, 1991

INVENTOR(S) : Tamotsu Nishiyama and Shigeo Kuninobu

It is certified that error appears in the above—identified patent and that said Letters Patent is hereby corrected as shown below:

| | | |
|---|---|---|
| Col. 8, | line 58 | "determined carried out" should be --carried out--; |
| | line 59 | "$C_{n-1}^{j}$" should be -- $c_{n-1}^{j}$ -- . |
| Col. 9, | line 10 | "$a_{i+1+1}^{j}$" should be -- $a_{i+1+}^{j}$ -- ; |
| | line 11 | "$C_{i}^{j}$" should be -- $c_{i}^{j}$ -- ; |
| | line 21 | "$a_{i-}^{j}$" should be -- $a_{i}^{j}$ -- ; |
| | line 24 | "$C_{i}^{j}$" should be -- $c_{i}^{j}$ -- ; |
| | line 36 | "$C_{i}^{j}$" should be -- $c_{i}^{j}$ -- ; |
| | line 57 | "$a_{0+}^{j}$, 801, and $a_{0}^{j}$," should be -- $a_{0+}^{j}$, 801, and $a_{0-}^{j}$, -- ; |
| | line 68 | "$q_{j-}$" should be -- $\overline{q}_{j-}$ -- . |
| Col. 10, | line 2 | "$q_{j-}$" should be -- $\overline{q}_{j-}$ -- ; |
| | line 10 | "$q_{j-}$" should be -- $\overline{q}_{j-}$ -- ; |
| | line 15 | "$q_{j-}$" should be -- $\overline{q}_{j-}$ -- ; |
| | line 68 | "binary/redundant/binary" should be --binary/redundant binary--. |

UNITED STATES PATENT AND TRADEMARK OFFICE
CERTIFICATE OF CORRECTION

PATENT NO. : 5,031,136
DATED : July 9, 1991
INVENTOR(S) : Tamotsu Nishiyama and Shigeo Kuninobu It is certified that error appears in the above—identified patent and that said Letters Patent is hereby corrected as shown below:

Col. 11, line 24    "$\overline{Y}_i$"    should be -- $\overline{y}_i$ --    ;

line 30    "$z_i^1 = x_i + Y_i$" should be "$z_i^1 = \overline{x}_i + y_i$" .

Col. 12, line 2    "$z_i^2 = x_1 \cdot y_i + x_1 \cdot y_i$; and" should be

"$z_i^2 = \overline{x}_i \cdot y_i + x_i \cdot \overline{y}_i$; and" ;

line 21    "$z_i^1 = x_i + y_i$" should be "$z_i^1 = \overline{x}_i + y_i$" ;

line 23    "$z_i^2 = x_i \cdot y_i + x_i \cdot y_i$; and" should be

"$z_i^2 = \overline{x}_i \cdot y_i + x_i \cdot \overline{y}_i$; and" .

Signed and Sealed this

Ninth Day of March, 1993

Attest:

STEPHEN G. KUNIN

*Attesting Officer*      *Acting Commissioner of Patents and Trademarks*